(12) United States Patent
Nilsson et al.

(10) Patent No.: US 11,201,704 B2
(45) Date of Patent: Dec. 14, 2021

(54) INTERLACE HOPPING IN UNLICENSED BAND

(71) Applicant: Telefonaktiebolaget LM Ericsson (publ), Stockholm (SE)

(72) Inventors: Thomas Nilsson, Malmö (SE); Peter Alriksson, Hörby (SE); Jung-Fu Cheng, Fremont, CA (US); Tai Do, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 829 days.

(21) Appl. No.: 15/780,399

(22) PCT Filed: Apr. 6, 2018

(86) PCT No.: PCT/EP2018/058851
§ 371 (c)(1),
(2) Date: May 31, 2018

(87) PCT Pub. No.: WO2019/120631
PCT Pub. Date: Jun. 27, 2019

(65) Prior Publication Data
US 2021/0176023 A1   Jun. 10, 2021

Related U.S. Application Data

(60) Provisional application No. 62/609,530, filed on Dec. 22, 2017.

(51) Int. Cl.
*H04L 5/00* (2006.01)
*H04W 72/12* (2009.01)
*H04W 16/14* (2009.01)

(52) U.S. Cl.
CPC .......... *H04L 5/0012* (2013.01); *H04L 5/0082* (2013.01); *H04W 16/14* (2013.01); *H04W 72/12* (2013.01)

(58) Field of Classification Search
CPC .... H04L 5/0012; H04L 5/0082; H04W 72/12; H04W 16/14
See application file for complete search history.

(56) References Cited

U.S. PATENT DOCUMENTS

2007/0081484 A1   4/2007 Wang
2008/0117853 A1*  5/2008 Kim ................. H04W 72/0406
                                            370/312
(Continued)

FOREIGN PATENT DOCUMENTS

WO      2017199219 A1     11/2017
WO   WO-2019091225 A1 *   5/2019   ............. H04B 1/713

OTHER PUBLICATIONS

International Search Report and Written Opinion dated Aug. 22, 2018, for corresponding International Application No. PCT/EP2018/058851; International Filing Date: Apr. 6, 2018 consisting of 13-pages.

*Primary Examiner* — Mohamed A Kamara
(74) *Attorney, Agent, or Firm* — Christopher & Weisberg, P.A.

(57) ABSTRACT

Methods and arrangements for determining a next interlace having a next structure to be applied during a next transmission interval in an unlicensed spectrum are disclosed. The next structure is to be applied for a transmission over a wireless interface in a wireless communications network operating in an unlicensed spectrum, wherein a first interlace is applied during transmission in a first transmission interval and wherein the first interlace has a first interlace structure formed by a plurality of physical resource blocks, PRBs, that are arranged with a given subcarrier spacing in one of a set of interlaces. The method includes defining a frequency shift based on the number of PRBs per interlace and a maximum allowed power for a single interlace and determining the (Continued)

next interlace structure by shifting the first interlace structure by the defined frequency shift.

25 Claims, 7 Drawing Sheets

(56) References Cited

U.S. PATENT DOCUMENTS

| | | |
|---|---|---|
| 2010/0329374 A1 | 12/2010 | Pi |
| 2017/0273056 A1 | 9/2017 | Papasakellariou |
| 2017/0289967 A1* | 10/2017 | Yu .................. H04L 5/0092 |
| 2019/0037593 A1* | 1/2019 | Yu .................. H04L 5/0092 |
| 2019/0068347 A1* | 2/2019 | Hamidi-Sepehr ............................ H04L 27/2643 |
| 2019/0124649 A1* | 4/2019 | Lunttila .............. H04L 5/001 |
| 2019/0150182 A1* | 5/2019 | Koorapaty ........ H04W 74/0808 370/329 |

* cited by examiner

INTERLACE HOPPING IN UNLICENSED BAND

CROSS-REFERENCE TO RELATED APPLICATIONS

This application is a Submission Under 35 U.S.C. § 371 for U.S. National Stage Patent Application of International Application Number: PCT/EP2018/058851, filed Apr. 6, 2018 entitled "INTERLACE HOPPING IN UNLICENSED BAND," which claims priority to U.S. Provisional Application No. 62/609,530, filed Dec. 22, 2017, entitled "INTERLACE HOPPING IN UNLICENSED BAND," the entireties of both of which are incorporated herein by reference.

TECHNICAL FIELD

The present disclosure relates generally to the field of transmission in a wireless communications network operating in an unlicensed spectrum. More particularly, it relates to methods and arrangements for determining a next interlace to be applied during a next transmission interval for a transmission in an unlicensed spectrum.

BACKGROUND

Universal Mobile Telecommunication System (UMTS), Long Term Evolution (LTE), and 5G, are examples of technologies for realizing high-speed packet-based communication in wireless communication systems. The Universal Terrestrial Radio Access Network, UTRAN, is the radio access network of a UMTS, Evolved UTRAN, E-UTRAN, is the radio access network of an LTE system, and New Radio, NR, the radio access network of 5G. In an UTRAN, E-UTRAN or NR, a wireless device, e.g., a User Equipment, UE, is wirelessly connected to a Radio Base Station, RBS, also known as a NodeB, eNodeB or gNodeB. An RBS is a general term for a network node capable of transmitting radio signals to a wireless device and receiving signals transmitted by the wireless device.

NR is developed to support multiple and substantially different use cases for maximum flexibility. The future development of cellular networks comprises large numbers of small, possibly autonomous, wireless devices, which typically transmit and receive only small amounts of data infrequently. Thus, beside the typical mobile broadband use case, also machine type communication (MTC), ultra-reliable low-latency communications (URLLC), side-link device-to-device (D2D) and a variety of other use cases are considered.

NR is targeting both licensed and unlicensed spectrum bands. It is expected that some features in NR will need to be adapted to comply with the special characteristics of the unlicensed band, e.g., of the unlicensed 2.4 GHz spectrum and of the unlicensed 5 GHz spectrum, as well as also different regulation. A subcarrier spacing of 60 or 30 kHz is a candidate for OFDM numerologies for NR operated in the unlicensed band, in the following denominated as NR Unlicensed (NR-U).

In NR the basic scheduling unit is called a slot. A slot consists of 14 OFDM symbols for the normal cyclic prefix configuration. The OFDM symbol duration at the same subcarrier spacing of 60 kHz is ~16.7 us. As an example, a slot with 14 OFDM symbols at 60 kHz subcarrier-spacing is 250 us long (including cyclic prefixes).

Prior to initiating transmissions in the unlicensed spectrum, regulatory requirements and/or spectrum efficiency considerations may require that some type of channel sensing is performed since the unlicensed spectrum is shared with other radio technologies, e.g., Wi-Fi. Furthermore, there may be imposed requirements relating to transmission power limitations or maximum channel occupancy time.

Channel sensing may be implemented by using a so-called Listen-Before-Talk, LBT, operation prior to transmission on a channel that uses unlicensed spectrum. LBT involves sensing a medium for a predefined minimum amount of time and backing off if the channel is busy. There are many different versions of LBT, depending on which radio technology the device uses and which type of data it wants to transmit at the moment. Common for all versions is that the sensing is done in a particular channel (corresponding to a defined carrier frequency) and over a predefined bandwidth. For example, in the 5 GHz band, the sensing is done over 20 MHz channels.

ETSI regulations mandate a limit on the power spectral density (PSD) in the 5 GHz band, i.e., a limit of 10 dBm per 1 MHz. The implication of the PSD requirement on the physical layer design is that transmission power is limited for any signal with a narrow transmission bandwidth, i.e., limiting the coverage for such a signal. In order to address this drawback, interlaced transmission, so called Block Interleaved Frequency Division Multiple Access (BI-FDMA) may be applied; spreading out transmission across the bandwidth by using an interlace, i.e., a spread out set of physical resource blocks (PRB).

In MulteFire and in LTE a subcarrier spacing of 15 kHz may be used; with an effective bandwidth of 18 MHz the number of available subcarriers are 1200. The subcarriers are grouped in 100 Physical Resource Blocks (PRBs), each consisting of 12 subcarriers. This OFDM numerology offers a good interlace option and in MulteFire, one carrier is divided into N interlaces (N=10 for 20 MHz carrier, and N=5 for 10 MHz carrier), each interlace consisting of M equally spaced physical resource blocks (M=10 for both 10 MHz and 20 MHz carrier).

A similar approach is considered for NR-U. However, a subcarrier spacing higher than 15 kHz generally causes more problems since fewer RBs are available. In NR-U a subcarrier spacing of 60 kHz is a candidate, which may cause problems in interlace design.

In the current RAN4 agreement 24 PRBs are available for 20 MHz and 60 kHz subcarrier spacing. In NR-U, some 25-27 PRBs are available for a bandwidth of 18 to 19.5 MHz. Table 1 below shows five interlace options for a subcarrier spacing of 60 kHz with three different numbers of PRBs available in a 20 MHz channel.

TABLE 1

| System Bandwidth | Bandwidth Utilization | Subcarrier spacing | Total number of PRBs | Number of interlaces | Number of PRBs/interlace | Inter PRB distance | Maximum power for a single interlace |
|---|---|---|---|---|---|---|---|
| 20 MHz | 0.90 | 60 kHz | 25 | 5 | 5 | 3.6 MHz | 17.0 dBm |
| 20 MHz | 0.97 | 60 kHz | 27 | 9 | 3 | 6.48 MHz | 14.8 dBm |
| 20 MHz | 0.97 | 60 kHz | 27 | 3 | 9 | 2.16 MHz | 19.5 dBm |
| 20 MHz | 0.86 | 60 kHz | 24 | 3 | 8 | 2.16 MHz | 19.0 dBm |
| 20 MHz | 0.86 | 60 kHz | 24 | 8 | 3 | 5.76 MHz | 14.8 dBm |

A different number of total PRBs might be available depending on the bandwidth utilization. A higher bandwidth utilization is advantageous but results in less guard band between adjacent channels and ads more filtering complexity in the receivers. The option with many interlaces suffers from a too low output power and the option that supports a high output power only provides a limited number of interlaces. The main problem with interlace design for this subcarrier spacing is that the number of PRBs are too low to allow for larger number of interlaces each having a reasonable number of PRBs, which determines the ability to use a high output power.

One option to allow for a more flexible design is to perform interlacing on subcarrier level instead on PRB level. However, such a design is not compatible with many of the current assumption for NR and would also lead to increased signaling overhead. This option could potentially also be more sensitive to inter carrier interference (ICI).

Thus, drawbacks remain with regard to output power also when applying interlaced transmission in the unlicensed spectrum.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above-identified deficiencies in the art or other disadvantages.

According to a first aspect, this object is achieved by a method for determining a next interlace having a next structure to be applied during a next transmission interval for a transmission over a wireless interface in a wireless communications network operating in an unlicensed spectrum. A first interlace is applied during transmission in a first transmission interval and the first interlace has a first interlace structure formed by a plurality of physical resource blocks, PRBs, that are arranged with a given subcarrier spacing in one of a set of interlaces. The method for determining a next interlace comprises defining a frequency shift based on the number of PRBs per interlace and a maximum allowed power for a single interlace and determining the next interlace structure by shifting the first interlace structure by the defined frequency shift.

According to embodiments of the disclosure, the method for determining a next interlace further comprises determining a minimum number of repetitions based on a length of the transmission and repeating a determining of a next interlace structure by shifting a current interlace structure by the defined frequency shift the minimum number of repetitions during the transmission.

According to a second aspect, the object is achieved by a computer program product comprising a non-transitory computer readable medium, having thereon a computer program comprising program instructions. The computer program is loadable into data processing circuitry and configured to cause execution of the method according to the first aspect when the computer program is run by the data processing circuitry.

According to a third aspect, the object is achieved by an arrangement for determining a next interlace having a next structure to be applied during a next transmission interval for a transmission over a wireless interface in a wireless communications network operating in an unlicensed spectrum. A first interlace is applied during transmission in a first transmission interval and the first interlace has a first interlace structure formed by a plurality of physical resource blocks, PRBs, that are arranged with a given subcarrier spacing in one of a set of interlaces. The arrangement comprises processing circuitry configured to cause defining of a frequency shift based on a number of PRBs per interlace and a maximum allowed power for a single interlace and determining of the next interlace by shifting the interlace structure by the defined frequency shift.

According to a fourth aspect, the object is achieved by a wireless device comprising the arrangement according to the third aspect.

According to a fifth aspect the object is achieved by a method for determining a next interlace for a next transmission to be received over a wireless interface in a wireless communications network. The method comprises receiving a first transmission during a first transmission interval, wherein the first transmission is received with a first interlace and wherein the first interlace has an interlace structure formed by a plurality of physical resource blocks, PRBs, that are arranged with a given subcarrier spacing in one of a set of interlaces. The method further comprises determining the next interlace structure based on a defined frequency shift.

According to a sixth aspect, the object is achieved by a computer program product comprising a non-transitory computer readable medium, having thereon a computer program comprising instructions, the computer program being loadable into data processing circuitry and configured to cause execution of the method according to the fifth aspect when the computer program is run by the data processing circuitry.

According to a seventh aspect, the object is achieved by an arrangement for determining a next interlace for a first transmission received over a wireless interface in a wireless communications network during a first transmission interval. The first transmission is received with a first interlace and the first interlace has an interlace structure formed by a plurality of physical resource blocks, PRBs, that are arranged with a given subcarrier spacing in one of a set of interlaces. The arrangement comprises processing circuitry configured to cause receiving of a first transmission during a first transmission interval, wherein the first transmission is received with a first interlace and wherein the first interlace has an interlace structure formed by a plurality of physical resource blocks, PRBs, that are arranged with a given subcarrier spacing in one of a set of interlaces. The processing circuitry is further configure to cause determining of the next interlace structure based on a defined frequency shift.

According to an eight aspect, the object is achieved by a radio access node comprising the arrangement of the seventh aspect.

In some embodiments, any of the above aspects may additionally have features identical with or corresponding to any of the various features as explained above for any of the other aspects.

An advantage of some embodiments is allowance for a more flexible interlace design in cases where subcarrier spacing results in a lower number of subcarriers, thereby improving frequency diversity.

Another advantage is the ability to use maximum allowed power associated with a single interlace scenario also in a use case of the flexible interlace design.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
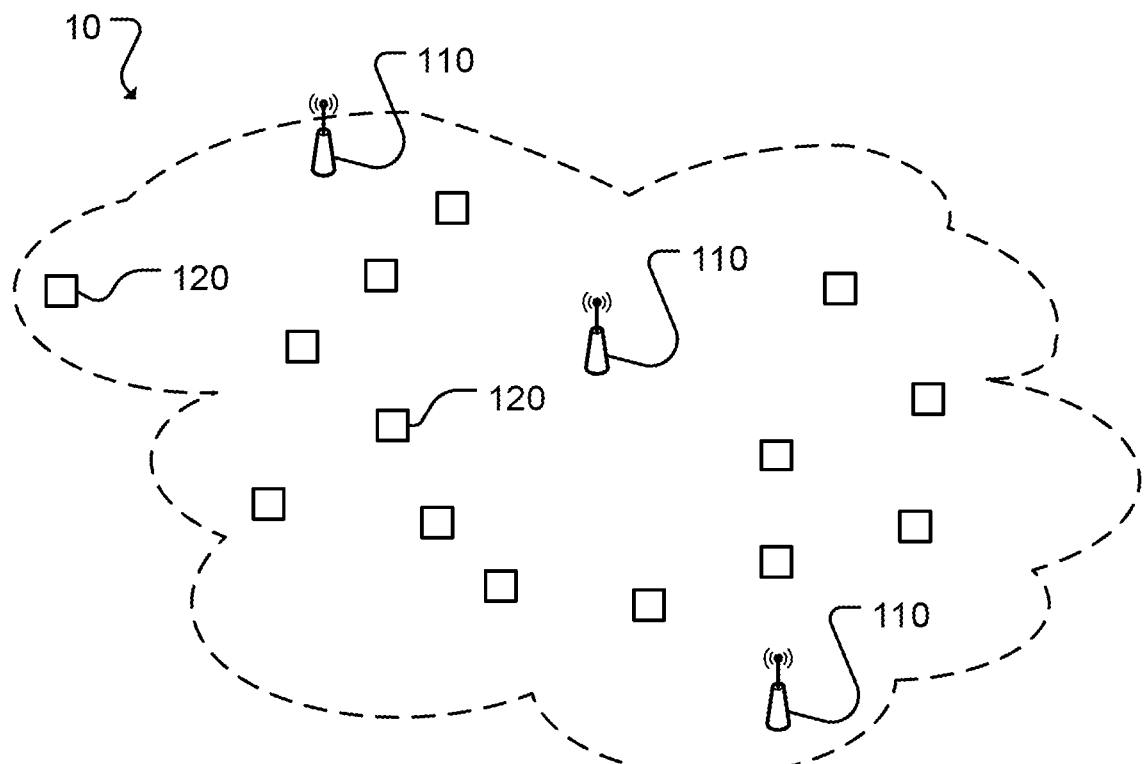
FIG. 1 schematically illustrates a wireless communications network comprising radio access nodes and a plurality of wireless devices.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise. In the context of the present disclosure "comprises/comprising" is taken to specify the presence of stated features, integers, steps, or components, but does not preclude the presence or addition of one or more other features, integers, steps, components, or groups thereof.

In the following disclosure, the term wireless device will be used to refer to remote wireless equipment that are configured for wireless access to a network node, e.g., a mobile device (MD), mobile station (MS), user equipment (UE), subscriber station, remote terminal, wireless terminal, user device (such as a mobile telephone or smartphone) or a stationary device or semi-stationary device, e.g., a so called cat-M UE for Machine Type Communication (MTC) use cases or any other type of MTC device set up for MTC in a wireless network structure.

A network infrastructure component that provides wireless access to the wireless device will be referred to as an access node. Depending on the network type, other well-known terms for such a network entity are radio base station (RBS), NodeB, eNodeB, gNodeB, or access point. These terms may be used interchangeably and are used to refer to network infrastructure components that provide wireless access to wireless devices.

FIG. 1 schematically illustrates an example wireless communications network 10, e.g., a wireless communications network configured for operation according to 5G technologies. The wireless communications network comprises a New Radio, NR, radio access network, e.g., NR operated in the unlicensed spectrum. The network comprises one or more radio access nodes 110 and one or more wireless devices 120. The wireless devices are configured to communicate with the radio access nodes over a wireless interface; transmitting uplink wireless signals to one or more receiving radio access nodes 110, and receiving downlink wireless signals from one or more transmitting radio access nodes.

The basic scheduling unit of NR, a slot, consists of 14 OFDM symbols for the normal cyclic prefix configuration. A subcarrier spacing of 60 or 30 kHz is a candidate for OFDM numerologies for NR operated in the unlicensed band, in the following denominated as NR Unlicensed (NR-U). When the subcarrier spacing is increased, for a fixed bandwidth, the number of subcarriers is decreased together with the symbol duration. A lower total number of subcarriers results in fewer options for a good interlace design. In the following disclosure, a subcarrier spacing of 60 kHz will be presumed. However, the methods and arrangements disclosed in the presentation is applicable also to other subcarrier spacing that imply a decreasing number of subcarriers. The OFDM symbol duration at the same subcarrier spacing of 60 kHz is ~16.7 us. As an example, a slot with 14 OFDM symbols at 60 kHz subcarrier-spacing is 250 us long (including cyclic prefixes).

Resource allocation is typically described in terms of Resource Blocks, PRBs, or Physical Resource Blocks, PRBs. The term "interlacing" refers to a technique in which PRBs are assigned or allocated according to a pattern. The term "interlace" refers to a set of physical resources that forms part of an interlacing pattern. In general, interlacing is considered to be performed at a resource block level if an interlace spans a set of subcarriers that corresponds to the size of a resource block in the frequency domain. Interlacing at a resource block level can also be referred to as block interleaved frequency division multiple access (BI-FDMA). Considering a scenario with OFDM numerology of 60 kHz subcarrier spacing and an effective bandwidth of 18 MHz, the number of subcarriers is 300 resulting in 25 PRBs. The most flexible interlace design that allows for good multiplexing for a scenario of 25 PRBs results in 5 interlaces each having 5 PRBs. In the current RAN4 agreement 24 Physical Resource Blocks, PRBs are available for 20 MHz and 60 kHz subcarrier spacing. In NR-U, some 25-27 PRBs are available for a bandwidth of 18 to 19.5 MHz.

A good interlace design needs balance a high number of interlaces, to allow for flexible allocations, and at the same time observe a maximum output power restriction. A low total number of subcarriers results in limited options for interlace design.

Table 1, as disclosed in the background section, shows five interlace options for subcarrier spacing of 60 kHz with three different numbers of PRBs available in a 20 MHz channel.

A different number of total PRBs might be available depending on the bandwidth utilization. A higher bandwidth utilization is advantageous but results in less guard band between adjacent channels and ads more filtering complexity in the receivers. The option with many interlaces suffers from a too low output power and the option that supports a high output power only provides a limited number of interlaces. The main problem with interlace design for this subcarrier spacing is that the number of PRBs are too low to allow for larger number of interlaces each having a reasonable number of PRBs, which determines the ability to use a high output power.

The present disclosure proposes a more flexible option as will be explained below, using a concept of different interlaces for different OFDM symbols.

In its most general form, the present disclosure presents a solution wherein the used interlace is shifted between transmission intervals, e.g., between OFDM symbol durations, thereby allowing use of a higher output power. Using this approach, a design with a reasonably high number of interlaces but a fewer number of PRBs per interface will be an option without compromising the ability to use a maximum allowed output power.

Figure 2:
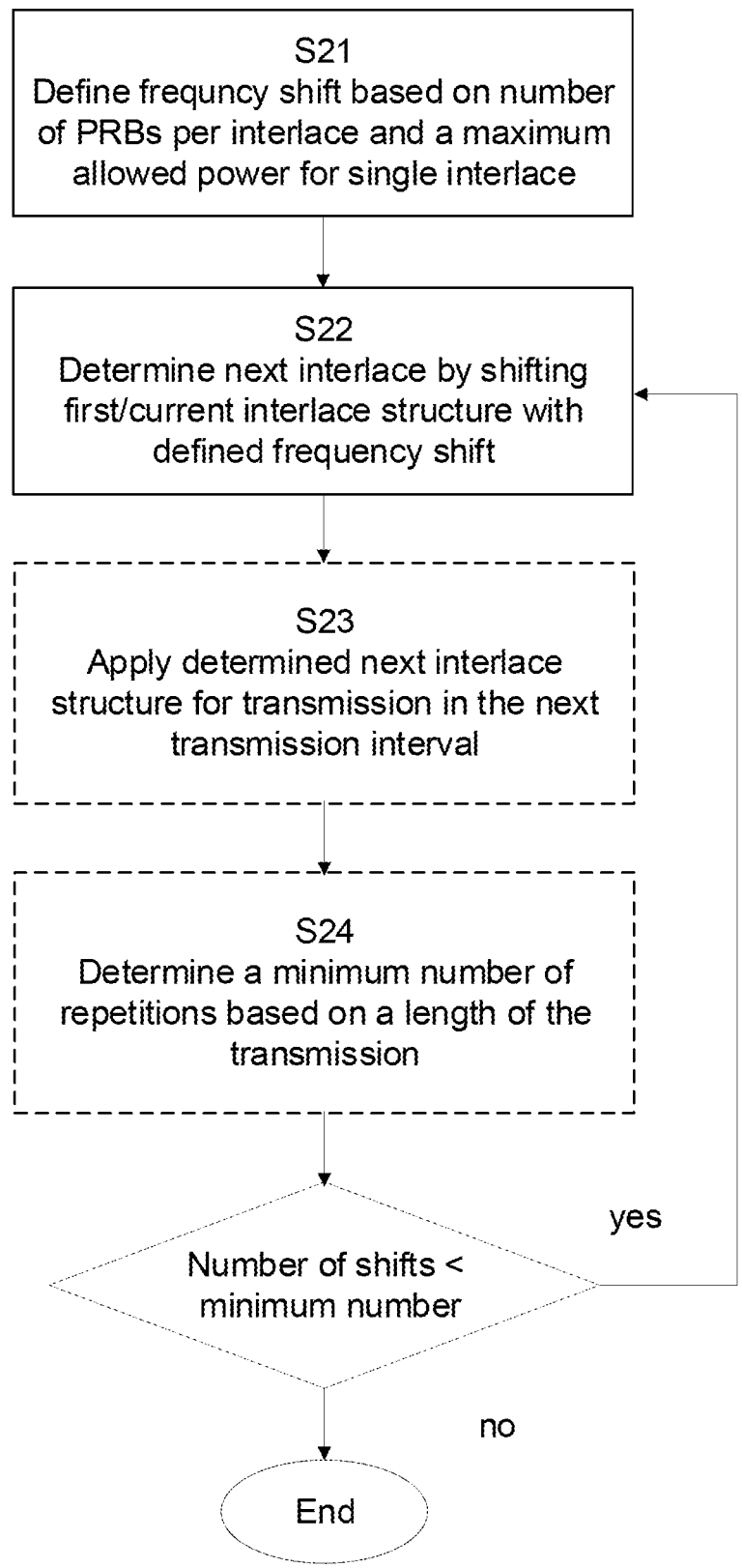
FIG. 2 is a flowchart illustrating example method steps according to some embodiments, e.g., as performed in a wireless device.

FIG. 2 is a flowchart illustrating example method steps according to some embodiments, e.g., a wireless device embodiment wherein transmission is performed by a transmitter of a wireless device. FIG. 2 discloses method steps performed for determining a next interlace having a next structure to be applied during a next transmission interval for a transmission over a wireless interface in a wireless communications network operating in an unlicensed spectrum. A first interlace is applied during transmission in a first transmission interval and the first interlace has a first interlace structure formed by a plurality of physical resource blocks, PRBs, that are arranged with a given subcarrier spacing in one of a set of interlaces. The method comprises defining S21 a frequency shift based on the number of PRBs per interlace and a maximum allowed power for a single interlace and determining S22 the next interlace structure by shifting the first interlace structure by the defined frequency shift. According to embodiments of the disclosure, the method step of applying S23 the determined next interlace structure for transmission in the next interval is performed. The disclosed method is implemented in a transmitter, e.g., in a wireless device transmitter since the PSD constraints are problematic primarily in the UL. However, under circumstances when there are PSD constraints also for downlink transmission, the method may be implemented in a transmitter of an access node or access point. As proposed, the method comprises shifting the interlace structure in the frequency domain each time interval, e.g., each one symbol.

Figure 3:
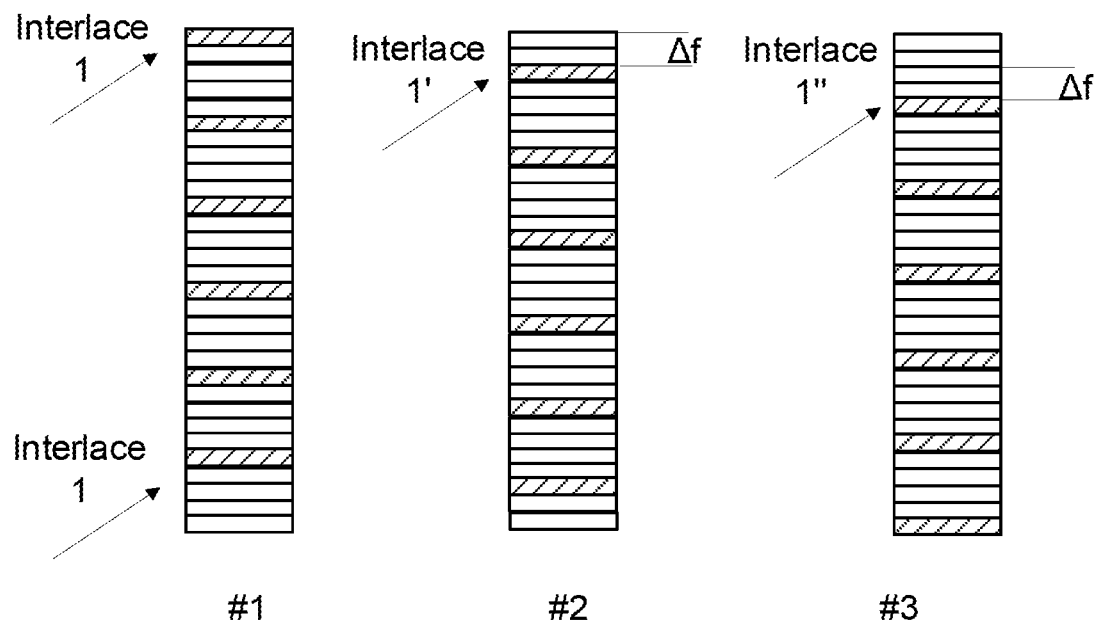
FIG. 3 shows an example interlace shift between subsequent transmission intervals according to some embodiments.

According to some embodiments, the set of interlaces comprises five or more interlaces, all interlaces of the set of interlaces comprising an equal number of resource blocks and the resource blocks being arranged with equal subcarrier spacing. FIG. 3 discloses a 25 PRB structure and an interlace design using 5 interlaces each having 5 PRBs, the minimum distance between two PRBs within the first interlace structure is 5 PRBs resulting in bandwidth of 5*0.72 MHz=3.6 MHz. In accordance with ETSI regulations, the total power allowed for a measurement bandwidth of 1 MHz is 10 dBm, applicable for one PRB of 0.72 MHz. Since the distance between two interlaces is larger than a measurement bandwidth of 1 MHz, it will be possible to use a total of 10 dBM+10*log 10(5)dBm, i.e., approximately 17 dBm. However, by shifting the interlace structure in two adjacent OFDM symbols, the PSD when measured over two OFDM symbols in time and 1 MHz in frequency equals half the power of one PRB transmitted in one symbol. The power per PRB can then be 13 dBm and the total allowed power would be 10+10*log 10(2)+10*log 10(5)≈20 dBm.

Considering instead an example with an interlace design having a total of 24 PRBs and 8 interlaces (see Table 1) each containing 3 PRBs, this interlace design supports 8 transmitting arrangements/wireless devices in the uplink (each wireless device being assigned one interlace) but only a transmit power of 14.8 dBm. Thus, repetitively applying a same interlace structure to uplink transmission, the range and/or capacity in the uplink will be significantly limited by the interlace design. Applying the teachings of the present disclosure provides one way to improve output power use. Assigning each transmitting arrangement/wireless device a first interlace structure in the uplink, defining an interlace shift based on the number of PRBs per interlace, i.e., 3, and the maximum allowed power for a single interlace, i.e., 14.8 dBm, determining a next interlace structure with the defined interlace shift and shifting the first interlace structure by the defined frequency shift during transmission in three consecutive next transmissions, this would result in a multiplexing capacity of 8 UEs and a supported power of 19.5 dBm without having to sacrifice multiplexing capacity to achieve the higher power.

Thus, there is a connection between the used interlace structure, e.g., a first interlace structure, and the number of unique frequency shifts required to support the full output power of 20 dBm. According to some embodiments, a step of determining S24 a minimum number of repetitions based on a length of the transmission is performed repeating a determining of the next interlace structure by shifting a current interlace structure by the defined frequency shift the minimum number of repetitions during transmission. Repeating is performed in the case where number of shifts is less than the determined minimum number of shifts. Otherwise, the method of determining a next interlace is concluded. Considering an example where an interlace with 3 PRBs and a restriction to use an output power of ~14.8 dBm is applied, a minimum number of repetitions may be determined to be four. Thus, full benefits of the proposed method is achieved by jumping at least four times during the transmission, each time to a next interlace structure determined by a frequency shift. When an interlace with 5 PRBs and a restriction not to exceed 17 dBm is applied, the benefit of allowing for full power is available already after performing one frequency shift. It is possible to stay at each unique interlace for a few symbols but a predetermined frequency shifts needs to be performed within the duration of the transmission.

According to some embodiments, shifting the first interlace structure by the defined frequency shift is performed per transmission interval and is performed prior to scheduling transmission for the next transmission interval. FIG. 3 show examples of shifting interlace structure between subsequent transmission intervals. According to some embodiments, each of the transmission intervals is a duration of an OFDM symbol and shifting in a next transmission interval implies shifting the interlace in two adjacent OFDM symbols or shifting the interlace between sets of consecutive OFDM symbols. The example of FIG. 3 illustrates interlace structure Interlace 1 having 5 PRBs and the bandwidth for one PRB is 12*60 kHZ=0.72 MHz. A shifting of interlace structure performed per transmission interval, OFDM symbols #1-#3 is disclosed. In transmission interval #1, an Interlace 1 is applied, in transmission interval #2, a shift has been made to Interlace 1', and the shifting is repeated also for subsequent transmission intervals. Shifting Interlace structures from Interlace 1 to Interlace 1' or from Interlace 1' to Interlace 1", i.e., shifting the interlace in two adjacent OFDM symbols, the Power Spectral Density (PSD) when measured over two OFDM symbols in time and 1 MHz in frequency equals half the power of one PRB transmitted in one symbol. The power per PRB can then be 13 dBM (twice as high) and the total allowed power would be 10+10*log 10(2)+10*log 10(5)≈20 dBm.

According to embodiments the defined frequency shift is equal to or exceeds a power spectral density, PSD, measurement bandwidth. According to some embodiments, the defined frequency shift is a predetermined number of subcarriers, e.g., a hopping offset selected as a multiple of a PRB bandwidth. Defining the frequency shift in terms of number of subcarriers, there is still a need to obey requirements of a minimum frequency shift exceeding the power spectral density PSD, measurement bandwidth. To reduce the implementation complexity—maintaining the number of supported interlaces and the subcarrier spacing, a hopping offset, i.e., the frequency shift, could be defined as multiplications of a PRB's BW, i.e., k*0.72 MHz for SCS 60 KHz. In which, k satisfies k0=<k=<M-k0. M represents the number of interlaces, k0 is the smallest factor so that k0*PRBs BW>1 MHz. This is equivalent to adding a cyclic shift in frequency domain to each OFDM symbol. Then, the maximal number of adjacent OFDM symbols that can be used for hopping is: M-2*k0+2. The maximum additional allowed power gain we can achieve by the proposed method is 10*log 10(M-2*k0+2) dBm. Thus, the combination of number of interlaces and subcarrier spacing bandwidth determines the gain of the disclosed method.

According to embodiments of the disclosure, the step of determining the next interlace structure may also be performed per set of consecutive transmission intervals and is performed prior to scheduling transmission for the next transmission interval, wherein the next transmission interval is a transmission interval in the set of consecutive transmission intervals.

Figure 4:
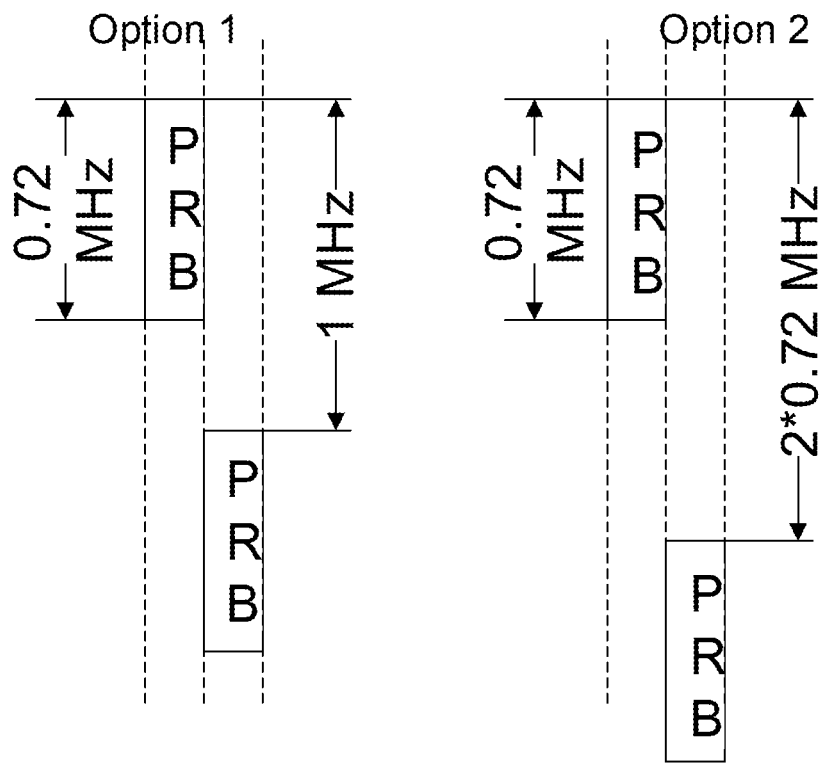
FIG. 4 illustrates examples of shift options according to some embodiments.

The frequency shift is defined based on the number of PRBs per interlace and the maximum allowed power for a single interlace, which results in various embodiments for defining the frequency shift. FIG. 4 discloses example options for frequency shift, i.e., a minimum shift embodiment represented as Option 1, and a PRB aligned shift represented as Option 2. Both alternatives are disclosed for the case of 60 kHz subcarrier spacing and thus a PRB bandwidth of 12*60 kHz. The principles of the disclosure are non-limiting and are of course equally applicable also to a subcarrier spacing of 30 kHz or other applicable subcarrier spacing. Thus, the shift needs to be large enough so that transmitted energy (in this case PRBs) in subsequent intervals/symbols does not fall into the same measurement bandwidth.

In the embodiment disclosed as Option 1, the defined shift represents a smallest possible shift of 1 MHz; corresponding to the measurement bandwidth for the PSD. The smallest possible shift is defined based on the number of PRBs per interlace and a maximum allowed power for a single interlace determined from the number of subcarriers and the measurement bandwidth for the PSD.

In the embodiment disclosed as Option 2, a PRB aligned shift is proposed, the shift being defined as a multiple of the PRB:s, i.e., a multiple of 0.72 MHz for a SCS of 60 kHz.

A problem with interlace hopping is channel estimation since the bandwidth used is changed every OFDM symbol. Then channel estimates from the previous interlace might not be useful in the next. Therefore pilots (DM-RS) need to be present in every PRB in the interlace. When the interlacing hopping is done per symbol and Cyclic-Prefix Orthogonal Frequency Division Multiplexing (CP-OFDM) is used for UL, a Demodulation Reference Sign (DMRS) design is to have DRMS resource elements (REs) in all of the OFDM symbols. However, only few REs is assigned for DMRS per PRB, e.g., 2 REs per PRB. In another DM-RS design the first N OFDM symbols are used to transmit DM-RS. Each wireless device will transmit DM-RS on all PRBs within its interlace and perform one whole hopping cycle. Thus, this approach will require tracking pilots, to track the phase change over time, in some of the REs in the PRB when interlace hopping, containing payload, starts following the DM-RS symbols.

In another embodiment, when the interlacing hopping is done per symbol and Discrete Fourier transform spread DFT-S-OFDM is used for UL, one DMRS design for the invention is to have DMRS on two entire OFDM symbols that are sufficiently spaced in frequency domain. Channel estimates for other PRBs are based on interpolation/extrapolation from the channel estimates of these two OFDM symbols.

In another embodiment the interlace hopping is done per Nth second symbol and every first symbol per hop contains DMRS and the remaining N-1 symbols contain payload.

Figure 5:
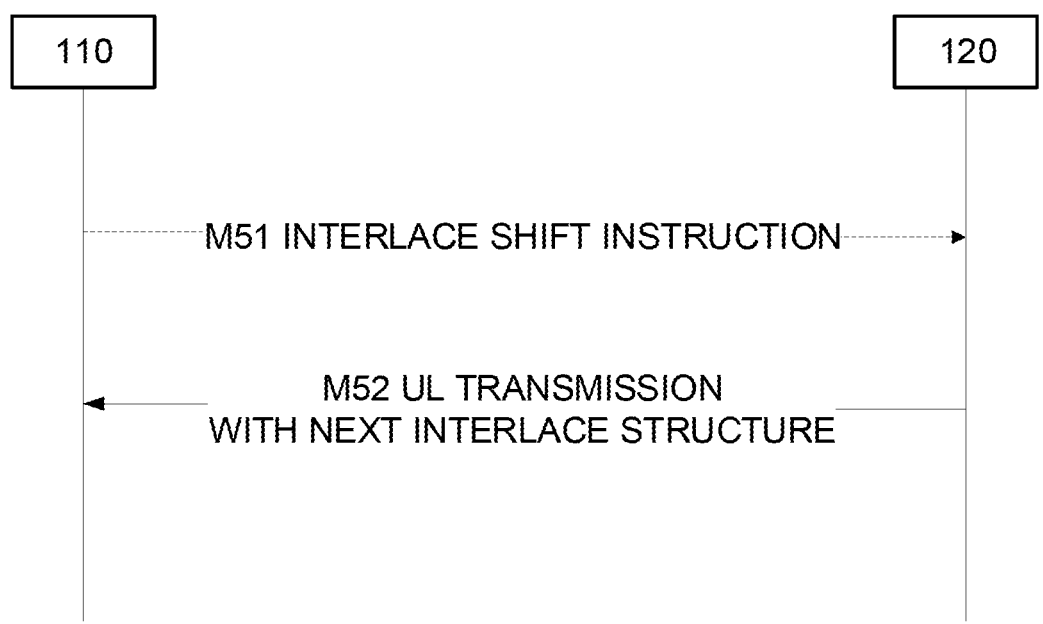
FIG. 5 illustrates an example sequence of messages exchanged in determining a next interlace according to some embodiments; e.g., between a wireless device and a radio access node.

FIG. 5 illustrates a sequence of messages exchanged in determining a next interlace; e.g., between a wireless device and a radio access node. In the disclosed scenario, the frequency shift may optionally be defined or interlace shifting optionally determined in the radio access node, or in a core network entity providing information on a determined interlace shift to the radio access node. The radio access node optionally signals information, here disclosed as an interlace shift instruction M51, to the wireless device, e.g., as part of an indication of interlace to be applied. The wireless device receives the information on the determined interlace shift, schedules and performs uplink transmission based on the received information, i.e., M52 UL transmission with next interlace structure.

Figure 6:
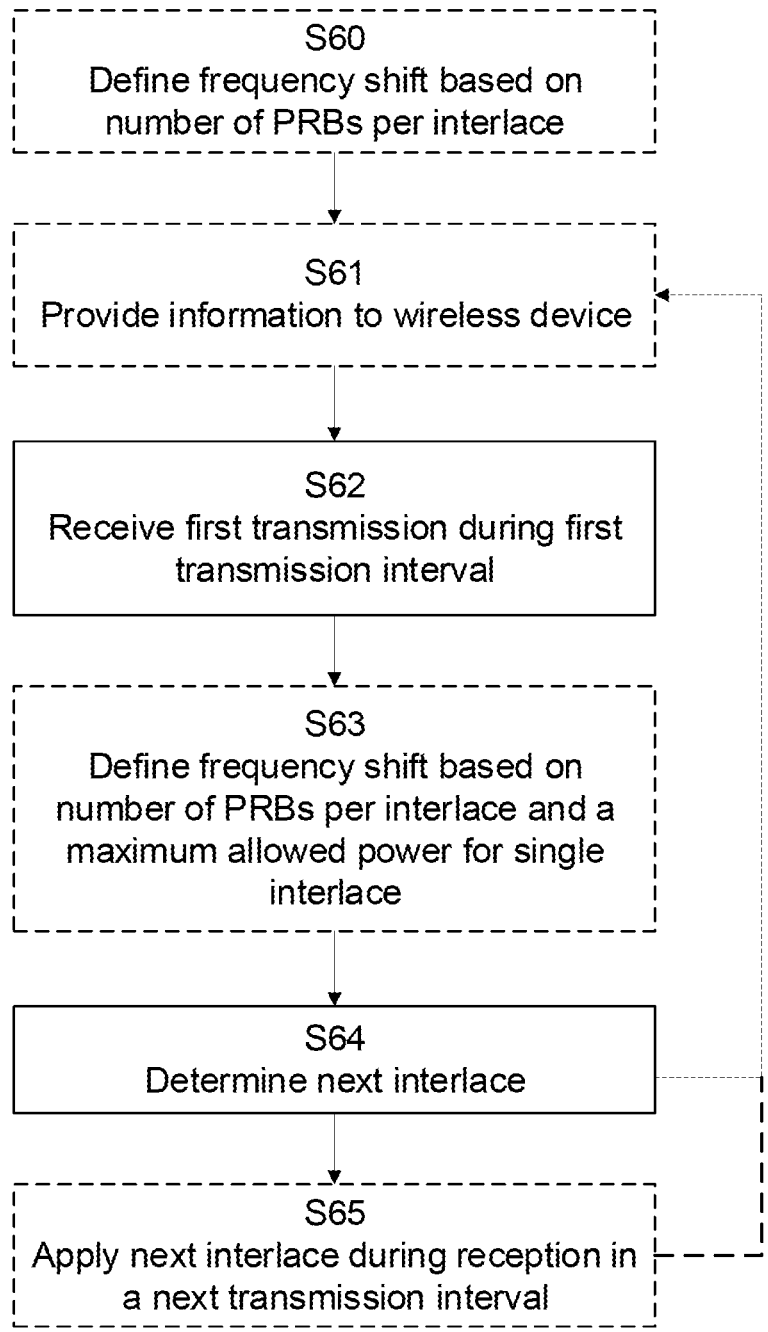
FIG. 6 is a flowchart illustrating example method steps according to some embodiments performed, e.g., as performed by a radio access node.

FIG. 6 is a flowchart illustrating example method steps according to some embodiments, e.g., a radio access node embodiment wherein reception is performed by a receiver of a radio access node. FIG. 6 discloses method steps performed for determining a next interlace having a next structure to be applied for a next transmission to be received over a wireless interface in a wireless communications network operating in an unlicensed spectrum. According to some embodiments, the method comprises defining S60 a frequency shift based on number of PRBs per interlace and providing S61 information to a receiving wireless device on a frequency shift to be implemented in the process of determining a next interlace. In its most general form, the method comprises receiving S62 a first transmission during a first transmission interval, wherein the first transmission is received with a first interlace and wherein the first interlace has an interlace structure formed by a plurality of physical resource blocks, PRBs, that are arranged with a given subcarrier spacing in one of a set of interlaces and determining S64 the next interlace structure by shifting the first interlace structure by a predefined frequency shift.

According to some embodiments, the method comprises defining S63 the frequency shift based on the number of PRBs per interlace and a maximum allowed power for a single interlace. According to embodiments, the method further comprises applying S65 the next interlace during reception in a next transmission interval and possibly providing S61 information to a wireless device for use in a next transmission interval. The procedure may of course be repeated a number of times corresponding to a number of received transmission intervals or consecutive transmission intervals to ensure that an adequate interlace structure is determined and applied during reception.

According to some embodiment, determining of the next interlace is performed per transmission interval or per set of consecutive transmission intervals and performed prior to receiving transmission for the next transmission interval. When performed per set of consecutive transmission intervals, the next transmission interval is a transmission interval in the set of consecutive transmission intervals. Thus, the method for determining a next interlace applicable to receipt of a transmission is analogous with the method for determining a next interlace to be applied for a transmission.

Figure 7:
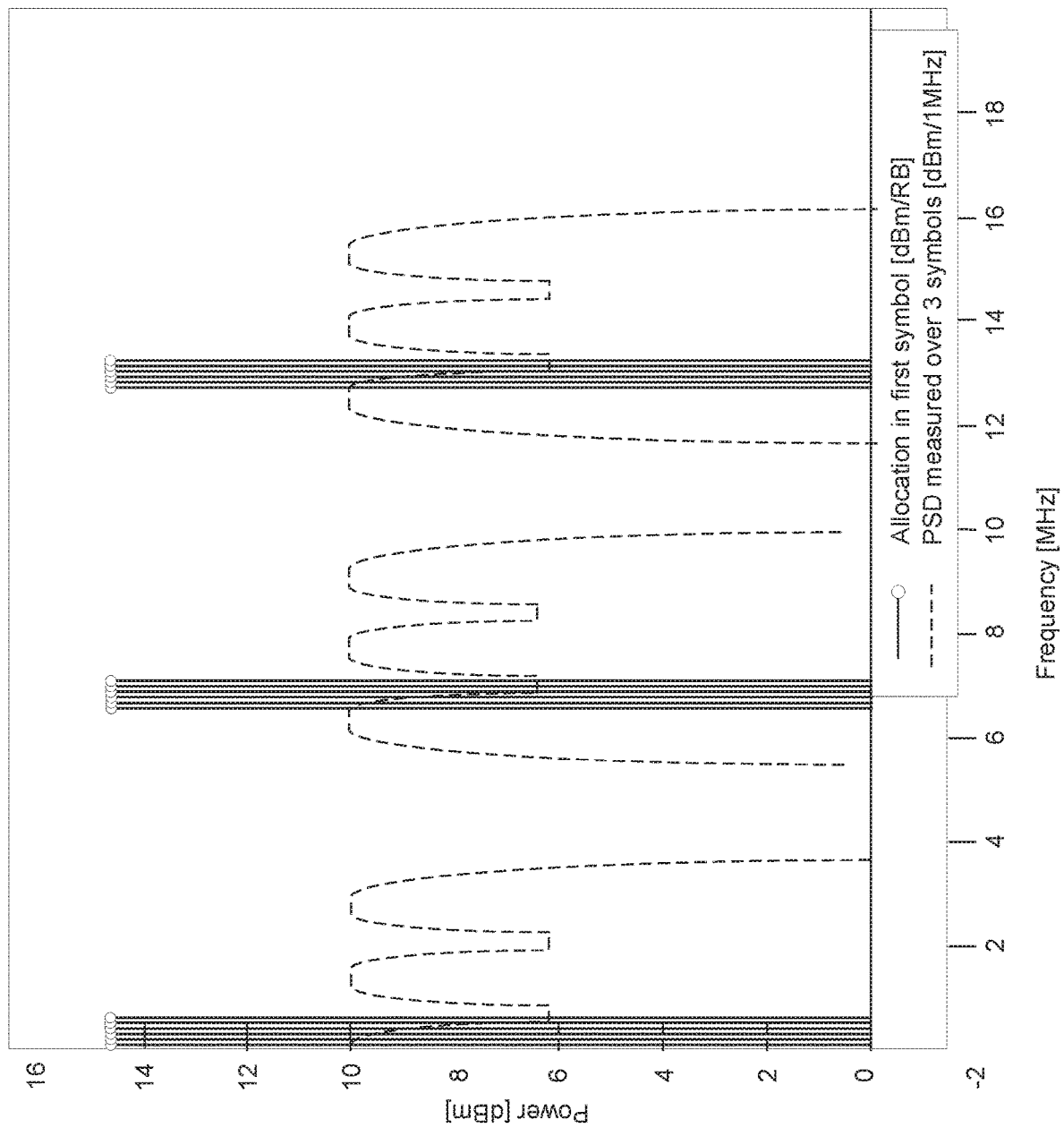
FIG. 7 illustrates power spectral density measurement results.

FIG. 7 discloses PSD measured over 3 symbols together with the allocated subcarriers in a first OFDM symbol. The representation relates to a scenario of 9 interlaces with 3 PRBs per interlace.

Figure 8A:
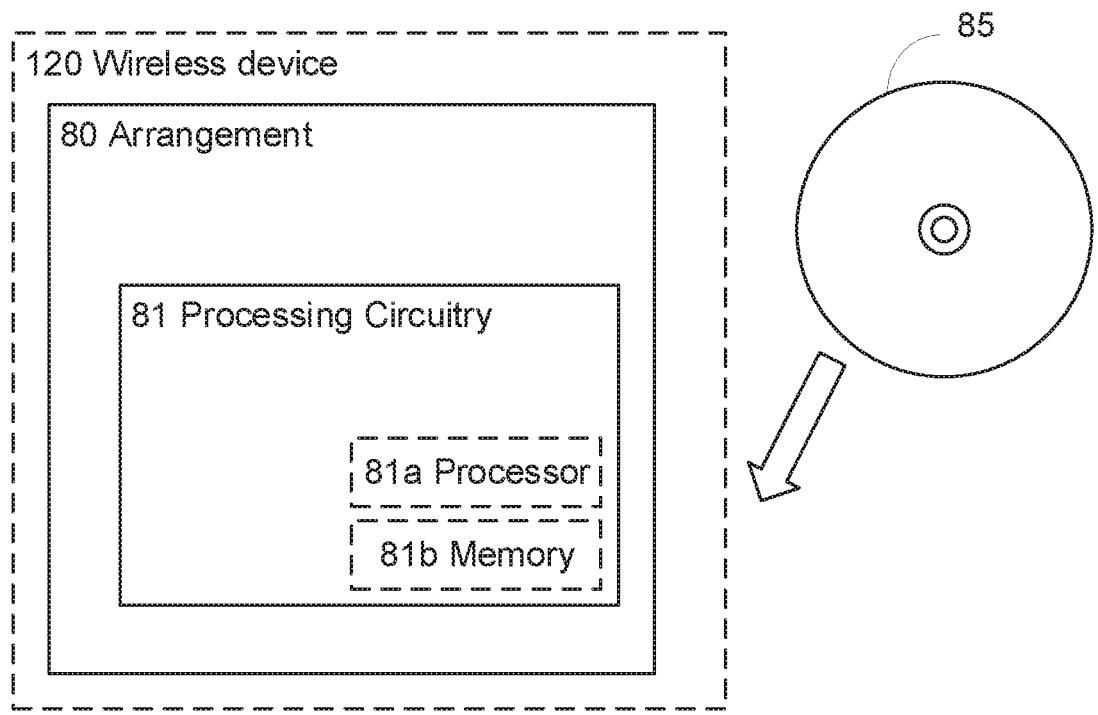
FIG. 8
a. is a schematic block diagram illustrating an example arrangement according to some embodiments;
b. is a schematic block diagram illustrating an example arrangement according to some embodiments.

FIG. 8a is a schematic block diagrams illustrating an example arrangement 80 for determining a next interlace for a first transmission received over a wireless interface in a wireless communications network during a first transmission interval, wherein the first transmission is received with a first interlace and wherein the first interlace has an interlace structure formed by a plurality of physical resource blocks, PRBs, that are arranged with a given subcarrier spacing in one of a set of interlaces. FIG. 8a also illustrates an example computer program product 85 comprising a non-transitory computer readable medium, having thereon a computer program comprising instructions. The computer program product comprises a computer readable medium such as, for example a universal serial bus (USB) memory, a plug-in card, an embedded drive or a read only memory (ROM). The computer readable medium has stored thereon a computer program comprising program instructions. The computer program is loadable into a processing circuitry 81, which may, for example, be comprised in a wireless device 120, e.g. of a wireless communication device or a network node. When loaded into the processing circuitry 81, the computer program may be stored in a memory 81b associated with or comprised in the processing circuitry. According to some embodiments, the computer program may, when loaded into and run by the processing circuitry, cause execution of method steps according to, for example, the method illustrated in FIG. 2 or otherwise described herein.

Thus, the computer program is loadable into data processing circuitry, e.g., into the processing circuitry 81 of FIG. 8a, and is configured to cause execution of embodiments for determining a next interlace during transmission when the computer program is run by the processing circuitry. Thus, the example arrangement of FIG. 8a may, for example, be configured to perform method steps described in connection with FIGS. 2 to 5.

The arrangement comprises processing circuitry 81 configured to cause defining of a frequency shift based on the number of PRBs per interlace and a maximum allowed power for a single interlace. The processing circuitry is further configured to cause determining of the next interlace structure by shifting the first interlace structure by the defined frequency shift.

According to aspects of the disclosure, the processing circuitry comprises a processor 81a and a memory 81b. The processor 81a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry. According to aspects of the disclosure, the arrangement may be implemented in wireless device 120 or in a host computer. The memory may be any suitable type of computer readable memory capable of storing instructions of a computer program and may be of volatile and/or non-volatile type.

According to aspects of the disclosure, the arrangement may be comprised in a wireless device, e.g., a User Equipment (UE) or Machine Type Communication (MTC) device capable of operating in the unlicensed spectrum.

Figure 8B:
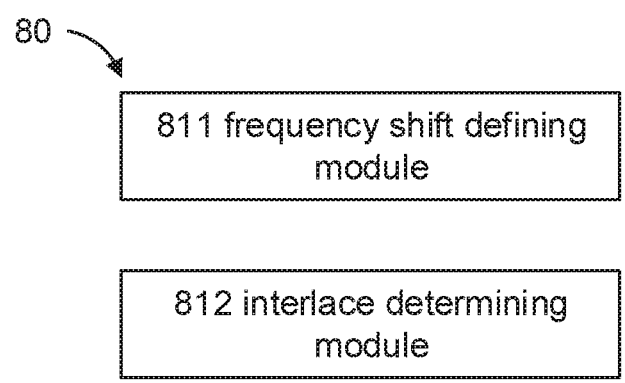

FIG. 8b provides another schematic block diagram illustration of the arrangement. The arrangement comprises a frequency shift defining module 811 configured for defining of a frequency shift based on a number of PRBs per interlace and a maximum allowed power for a single interlace. The arrangement further comprises a next interlace determining module 812 configured for determining of the next interlace by shifting the interlace structure by the defined frequency shift. Other or more of the modules 811 and 812 may, e.g., be comprised in (or otherwise associated with) the processing circuitry 81 of FIG. 8a. The example arrangement of FIG. 8b may, for example, be configured to perform method steps described in connection with FIGS. 2 to 5.

Figure 9A:
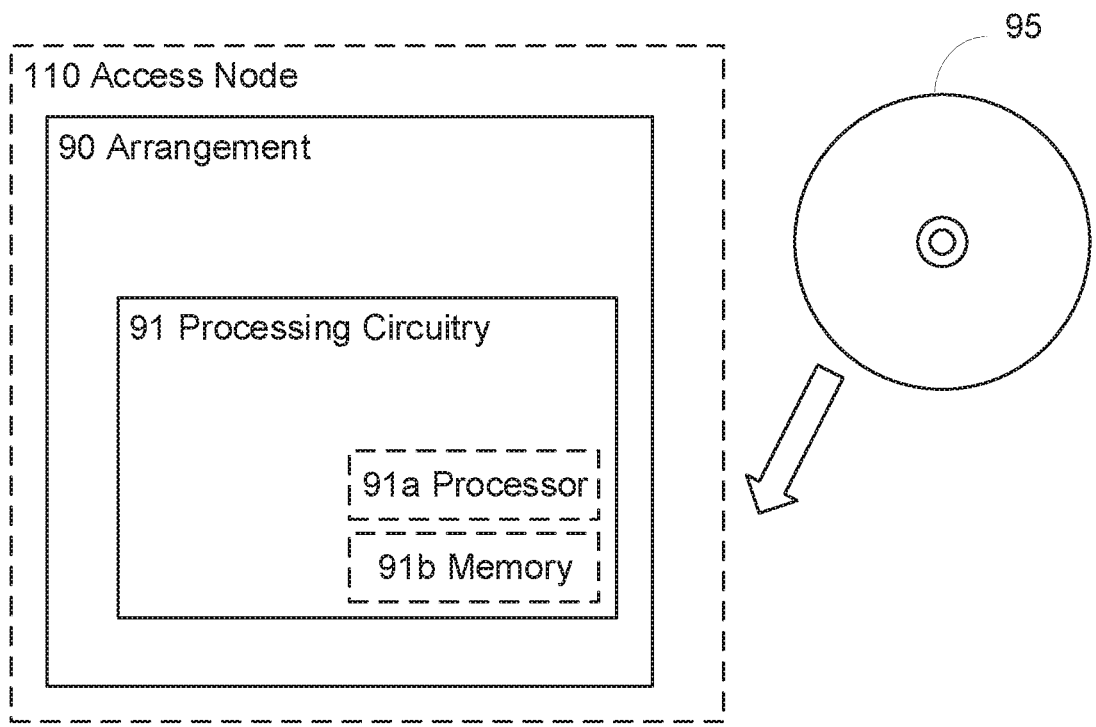
FIG. 9
a. is a schematic block diagram illustrating an example arrangement according to some embodiments;
b. is a schematic block diagram illustrating an example arrangement according to some embodiments.

FIG. 9a is a schematic block diagrams illustrating an example arrangement 90 for determining a next interlace for a next transmission to be received over a wireless interface in a wireless communications network. FIG. 9a also illustrates a computer program product 95 comprising a non-transitory computer readable medium, having thereon a computer program comprising instructions. The computer program is loadable into data processing circuitry, e.g., into the processing circuitry of FIG. 9a, and is configured to cause execution of embodiments for determining a next interlace during transmission when the computer program is run by the data processing circuitry. Thus, the example arrangement of FIG. 9a may, for example, be configured to perform method steps described in connection with FIGS. 3 to 6.

The arrangement comprises processing circuitry 91 configured to cause receiving a first transmission during a first transmission interval, wherein the first transmission is received with a first interlace and wherein the first interlace has an interlace structure formed by a plurality of physical resource blocks, PRBs, that are arranged with a given subcarrier spacing in one of a set of interlaces. The processing circuitry is further configured to cause determining of a next interlace structure based on a defined frequency shift.

According to aspects of the disclosure, the processing circuitry comprises a processor 91a and a memory 91b. The processor 91a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry.

According to aspects of the disclosure, the arrangement may be comprised in a radio access node 120 or in a host computer. The memory may be any suitable type of computer readable memory capable of storing instructions of a computer program and may be of volatile and/or non-volatile type.

Figure 9B:
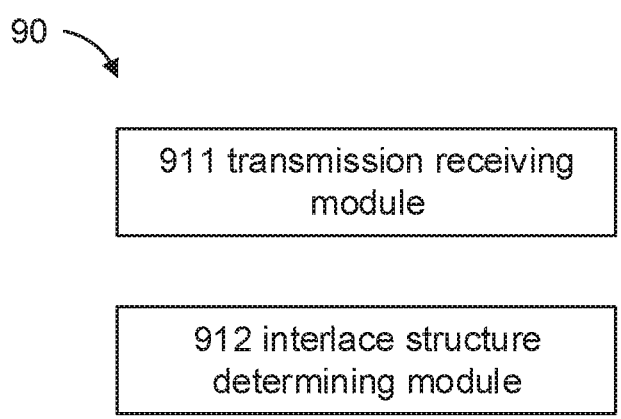

FIG. 9b provides another schematic block diagram illustration of the arrangement. The arrangement comprises a transmission receiving module 911 configured for receiving a first transmission during a first transmission interval, wherein the first transmission is received with a first interlace and wherein the first interlace has an interlace structure formed by a plurality of physical resource blocks, PRBs, that are arranged with a given subcarrier spacing in one of a set of interlaces. The arrangement further comprises a next interlace determining module 912 configured for determining of the next interlace by shifting the interlace structure by a predefined frequency shift. Other or more of the modules 911 and 912 may, e.g., be comprised in (or otherwise associated with) the processing circuitry 91 of FIG. 9a. The example arrangement of FIG. 9b may, for example, be configured to perform method steps described in connection with FIGS. 3 to 6.

The description of the example embodiments provided herein have been presented for purposes of illustration. The description is not intended to be exhaustive or to limit example embodiments to the precise form disclosed; modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims.

Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

Hence, it should be understood that the details of the described embodiments are merely examples brought forward for illustrative purposes, and that all variations that fall within the scope of the claims are intended to be embraced therein.

The invention claimed is:

1. A method for determining a next interlace having a next structure to be applied during a next transmission interval for a transmission over a wireless interface in a wireless communications network operating in an unlicensed spectrum, a first interlace being applied during transmission in a first transmission interval and the first interlace having a first interlace structure formed by a plurality of physical resource blocks, PRBs, that are arranged with a given subcarrier spacing in one of a set of interlaces, the method comprising:

defining a frequency shift based on the number of PRBs per interlace and a maximum allowed power for a single interlace; and determining the next interlace structure by shifting the first interlace structure by the defined frequency shift.

2. The method of claim 1, wherein the transmission is performed from a transmitter of a wireless device.

3. The method of claim 1, wherein determining the next interlace structure is performed per transmission interval and is performed prior to scheduling transmission for the next transmission interval.

4. The method of claim 1, wherein determining the next interlace structure is performed per set of consecutive transmission intervals and is performed prior to scheduling transmission for the next transmission interval, wherein the next transmission interval is a transmission interval in the set of consecutive transmission intervals.

5. The method of claim 1, further comprising:
applying the determined next interlace structure for transmission in the next transmission interval.

6. The method of claim 5, further comprising:
determining a minimum number of repetitions based on a length of the transmission; and
repeating a determining of the next interlace structure by shifting a current interlace structure by the defined frequency shift the minimum number of repetitions during transmission.

7. The method of claim 1, wherein a transmission interval is an OFDM symbol duration.

8. The method of claim 1, wherein the set of interlaces comprises at least five more interlaces, all interlaces of the set of interlaces comprising an equal number of resource blocks and the resource blocks being arranged with equal subcarrier spacing.

9. The method of claim 1, wherein the defined frequency shift is equal to or exceeds a power spectral density, PSD, measurement bandwidth.

10. The method of claim 1, wherein the defined frequency shift is a predetermined number of subcarriers.

11. The method of claim 1, wherein the defined frequency shift is a hopping offset selected as a multiple of a PRB bandwidth.

12. A non-transitory computer readable medium, having thereon a computer program comprising instructions, the computer program being loadable into data processing circuitry and, when the computer program is run by the data processing circuitry, the computer program performs a method for determining a next interlace having a next structure to be applied during a next transmission interval for a transmission over a wireless interface in a wireless communications network operating in an unlicensed spectrum, a first interlace being applied during transmission in a first transmission interval and the first interlace having a first interlace structure formed by a plurality of physical resource blocks, PRBs, that are arranged with a given subcarrier spacing in one of a set of interlaces, the method comprising:

defining a frequency shift based on the number of PRBs per interlace and maximum allowed power for a single interlace; and determining the next interlace structure by shifting the first interlace structure by the defined frequency shift.

13. An arrangement for determining a next interlace having a next structure to be applied during a next transmission interval for a transmission over a wireless interface in a wireless communications network operating in an unlicensed spectrum, a first interlace being applied during transmission in a first transmission interval and the first interlace ha; having a first interlace structure formed by a plurality of physical resource blocks, PRBs, that are arranged with a given subcarrier spacing in one of a set of interlaces, the arrangement comprising processing circuitry configured to cause:

defining a frequency shift based on a number of PRBs per interlace and a maximum allowed power for a single interlace; and determining of the next interlace by shifting the interlace structure by the defined frequency shift.

14. The arrangement of claim 13, wherein the arrangement is comprised in a wireless device.

15. A method for determining a next interlace for a next transmission to be received over a wireless interface in a wireless communications network, the method comprising:

receiving a first transmission during a first transmission interval, the first transmission being received with a first interlace and the first interlace having an interlace structure formed by a plurality of physical resource blocks, PRBs, that are arranged with a given subcarrier spacing in one of a set of interlaces; and determining a next interlace structure based on a defined frequency shift, the defined frequency shift being based at least in part on a number of PRBs per interlace.

16. The method of claim 15, further comprising:
defining the frequency shift based on the number of PRBs per interlace and a maximum allowed power for single interlace.

17. The method of claim 15, wherein the receiving is performed in a receiver of a radio access node.

18. The method of claim 15, further comprising
providing information to a wireless device on one of the defined frequency shift and a determined next interlace structure.

19. The method of claim 15, wherein determining of the next interlace structure is performed per transmission interval and performed prior to receiving transmission for the next transmission interval.

20. The method of claim 15, wherein determining of the next interlace is performed per set of consecutive transmission intervals and performed prior to receiving transmission for the next transmission interval, wherein the next transmission interval is a transmission interval in the set of consecutive transmission intervals.

21. The method of claim 15, further comprising:
applying the determined next interlace during reception in a next transmission interval.

22. The method of claim 21, further comprising repeating the determining the next interlace and applying the determined next interlace during reception in at least one further transmission interval.

23. A non-transitory computer readable medium, having thereon a computer program comprising instructions, the computer program being loadable into data processing circuitry and, when the computer program is run by the data processing circuitry, the computer program performs a method for determining a next interlace for a next transmission to be received over a wireless interface in a wireless communications network, the method comprising:

receiving a first transmission during a first transmission interval, the first transmission being received with a first interlace and the first interlace having an interlace structure formed by a plurality of physical resource blocks, PRBs, that are arranged with a given subcarrier spacing in one of a set of interlaces; and determining a next interlace structure based on a defined frequency shift, the defined frequency shift being based at least in part on a number of PRBs per interlace.

24. An arrangement for determining a next interlace for a first transmission received over a wireless interface in a wireless communications network during a first transmission interval, the first transmission being received with a first interlace and wherein the first interlace having an interlace structure formed by a plurality of physical resource blocks, PRBs, that are arranged with a given subcarrier spacing in one of a set of interlaces, the arrangement comprising processing circuitry configured to cause:

receiving of a first transmission during a first transmission interval, the first transmission being received with a first interlace and the first interlace having an interlace structure formed by a plurality of physical resource blocks, PRBs, that are arranged with a given subcarrier spacing in one of a set of interlaces; and determining of a next interlace structure based on a defined frequency shift, the defined frequency shift being based at least in part on a number of PRBs per interlace.

25. The arrangement of claim 24, wherein the arrangement is included in a radio access node.

\* \* \* \* \*